United States Patent Office 3,445,423
Patented May 20, 1969

3,445,423
POLYURETHANE COMPOSITION FOR GLASS COATING AND LAMINATING STABILIZED BY RESORCINOL MONOBENZOATE
Norman B. Sunshine, Mount Prospect, Ill., and Robert M. Hick, Jr., Springfield, and Joseph O. Gould, Norwood, Pa., assignors to E. I. du Pont de Nemours and Company, Wilmington, Del., a corporation of Delaware
No Drawing. Filed June 30, 1966, Ser. No. 561,735
Int. Cl. C08g 51/58, 51/60; B32b 17/06
U.S. Cl. 260—45.85                        2 Claims

ABSTRACT OF THE DISCLOSURE

There is disclosed an adhesive polyurethane composition containing a stabilizer compound (e.g. resorcinol monobenzoate); because of the presence of the stabilizer, the composition has beneficial utility for the formation of an adherent polyurethane layer on glass and acrylic plastic articles in the process of coating such articles or laminating them to structural members of metal or other materials. The composition is especially useful in applications where it is important that the polyurethane layer retains a high level of bond strength on prolonged exposure to sunlight.

---

This invention relates to a polyurethane composition adapted for use in the application of adherent coatings and bonding layers on glass and acrylic plastic articles. The invention also relates to a composite article obtained by applying a layer of the composition to a glass or acrylic plastic member, for example before bonding or laminating said member to metal or to other solid materials.

The coating and laminating industries are in need of a liquid polymeric composition which can be applied to the surface of a glass or acrylic plastic member and which has strong adhesion to said surface after the composition is solidified and the resulting composite article is exposed to sunlight for an extended period of time. There is particular need for such a composition adapted for use in the formation of a solid adherent interlayer between a transparent or translucent glass or acrylic plastic member and a structural member of metal or other solid material, especially when the resulting composite article is to be exposed to sunlight for an extended period of time.

The term "acrylate plastic" herein means a solid polymer selected from the group consisting of poly(alkyl acrylates) and poly(alkyl methacrylates) wherein the alkyl radical contains 1 to 8 carbon atoms.

In a broad sense, the composition of the present invention is a polyurethane composition (initially in liquid form) having incorporated therein about 0.1 to 2.0% (based on the weight of polyurethane) of a stabilizer consisting essentially of a compound from the group consisting of (A) resorcinol monobenzoate,
(B) pentadecyl - 3,5 - di-t-butyl-4-hydroxybenzyl-hydrogen-phosphonate,
(C) octyl-3-(3,5-di-t-butyl-4-hydroxyphenyl)propionate,
(D) tetra-[3 - (3,5 - di-t-butyl-4-hydroxyphenyl)propionyloxymethyl]methane,
(E) ethyl-2-cyano-3-phenyl-cinnamate,
(F) N,N'-ditertiary-butylurea, and
(G) phenothiazine.

The composite article of the present invention, defined broadly, comprises (J) a layer of glass or acrylic plastic and
(K) in adherent contact with (J), a solidified layer of the composition defined in the previous paragraph.

In preferred embodiments of the invention, the composite article also comprises (L) in adherent superposed contact with (K), a layer of a solid material from the group consisting of metal, glass, wood, plastic, leather, cement compositions and ceramics.

The composition of the present invention contains at least one of the stabilizer compounds (A) through (G) mentioned above. The total amount of the stabilizer present in the composition is equal to about 0.1 to 2.0%, preferably about 0.4 to 0.8%, based on the weight of polyurethane polymer present in the composition.

In a preferred embodiment of the composite article of the present invention, the layer of glass (J) is an automobile windshield (i.e., the peripheral portion thereof), the polyurethane of layer (K) is a cured polyurethane elastomer, and layer (K) is in interposed adherence with layer (J) and a windshield-receiving member (usually painted steel) of an automobile body.

The polyurethane layer (K) of the composite article is prepared from a liquid composition (1) which is capable of being converted (cured) to a substantially solid (non-liquid) polyurethane composition after being applied to the layer or layers to be coated or laminated and (2) which contains a stabilizer selected from compounds (A) to (G) inclusive described above in an amount sufficient to provide substantially better retention of adhesion between the layers of the cured composite article when the article is exposed to sunlight; that is, the retention of adhesion is substantially better than when said stabilizer is omitted from the composition.

The liquid composition employed in forming layer (K) can comprise (a) an isocyanate-terminated polyurethane capable of reacting with water vapor in the air to form a solid polymer (e.g., the urethane adhesives classified as Type II by the American Society for Testing Materials), or (b) a mixture of an isocyanate-terminated polyurethane and a compound having a plurality of groups bearing active hydrogen atoms which groups are capable of reacting with the isocyanate groups to form a solid polymer. Among the useful active hydrogen-containing compounds are low molecular weight polyols, organic diamines and mixtures thereof. Such liquid compositions are well known in the art; a skilled polyurethane chemist will have no difficulty in selecting a liquid polyurethane composition suitable for use in the present invention after reading the present disclosure. Catalysts, volatile organic liquids, coloring agents, viscosity-controlling agents, and other additives known to be useful in liquid polyurethane compositions can be added to the liquid composition.

The isocyanate-terminated polyurethanes can be prepared by agitating a molar excess of an organic diisocyanate with a polyalkyleneether glycol, a polyalkyleneether-thioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. It is to be understood that mixtures of the foregoing polyols may be employed if desired. Among the useful polyurethanes are those described in U.S. Patent 2,984,645, column 5, line 26, to column 7, line 45.

The glass or acrylic plastic surface to which the liquid polyurethane composition is applied is preferably first coated with an adhesion-enhancing primer, for example a 1 to 3% ethanol solution of gamma-aminopropyl-triethoxysilane.

The polyurethane composition of this invention has beneficial utility for the formation of adherent coatings, sealing strips and bonding layers on glass and acrylic plastic articles especially such articles which are transparent or translucent. The composition is also useful for coating, caulking and bonding other bodies of solid materials, for example shaped articles of metal, wood, plastic leather, concrete and ceramics; beneficial results in such applications are especially noticeable when the resulting composite article is used or stored where it is exposed to the direct rays of the sun.

When the composition is applied in liquid form to a glass or acrylic plastic surface and then solidified, it has unexpectedly good adhesion to the surface even after the composite article has been exposed for extended periods of time to high humidity, rain and/or to sunlight. When the liquid composition is placed in interposed contact with a glass or acrylic plastic article and an article of metal or other solid material, after which the composition is solidified, the strength of the bond between the two articles remains surprisingly strong even after the bonded assembly has been exposed to direct sunlight for extended periods of time.

The examples which follow are given for the purpose of illustrating the invention. All quantities shown are on a weight basis unless otherwise indicated.

EXAMPLE I-A

An automobile windshield made of ¼ inch thick safety glass is resiliently and sealingly bonded by means of a composite bonding layer to the steel windshield-receiving member of an automobile body as follows.

The peripheral portion of the windshield surface which will be in contact with the bonding layer is prepared (a) washing it with a composition consisting of one part isopropanol, one part Butyl Carbitol and 98 parts water and wiping it with a clean dry cloth, (b) wiping it with a clean cheesecloth wet with an adhesion-enhancing primer consisting of a 2% solution in ethanol of gamma-aminopropyl-triethoxysilane and (c) allowing the primer to dry for 30 minutes at 25° C.

The portion of the windshield-receiving member which will be in contact with the bonding layer is prepared by (1) applying a zinc phosphate coating ("Bonderite" 100), (2) spraying on a 0.001-inch thick coat (dry film thickness) of a primer having the composition given under Formula B below and allowing it to dry for 30 at 196° C., (3) spraying on a 0.025-inch thick coat (dry film thickness) of a known automobile enamel (as described in Example 10 of U.S. Patent 2,934,509) and baking it for 30 minutes at 135° C. and (4) brushing on a coat of a primer having the composition given under Formula B below and allowing it to dry for 30 minutes at 25° C.

Formula A

| | Parts |
|---|---|
| Alkyd resin solution | 18.0 |
| Urea formaldehyde resin, 60% solution in butanol | 2.0 |
| Iron oxide | 11.5 |
| Aluminum silicate | 9.0 |
| Barytes | 28.8 |
| Aromatic solvent B.R. 190–210° C. | 16.0 |
| Aliphatic solvent B.R. 190–250° C. | 14.7 |
| | 100.0 |

In Formula A, the alkyl resin is a 40% oil-length dehydrated castor oil modified glyceryl-ethylene glycol phthalate alkyd resin having an acid number of about 8 and a content of unesterified hydroxyl groups equivalent to 4.1% glycerol; this resin is added as a 55% solution in xylene having a Gardner-Holdt viscosity of Y.

Formula B

| | Parts |
|---|---|
| Solution of methyl-methacrylate-hydroxy-amino propyl resin [1] | 45.0 |
| Poly(methyl methacrylate), 40% solution in a 33/67 blend of acetone and toluene | 5.5 |
| Acrylic resin/carbon black dispersion [2] | 12.3 |
| Xylene | 30.1 |
| Cellosolve acetate | 0.3 |
| Butyl benzyl phthalate | 6.8 |
| | 100.0 |

[1] Made as described in Example 1 of U.S. Patent 2,949,445; added as a 30% solution in a 56/44 blend of toluene and isopropanol.
[2] Prepared by mixing 35 parts xylene, 50 parts poly(methyl methacrylate), 10 parts carbon black, grinding the mixture thoroughly in a ball mill and adding 5 parts xylene.

A polyurethane adhesive composition is prepared by (a) charging a reaction vessel (equipped with stirrer, thermometer, reflux condenser and nitrogen inlet) with 3110 parts polypropylene glycol (molecular weight 2000), 20 parts petroleum naphtha (boiling range 88 to 142° C.), 180 parts carbon black and 3080 parts finely-divided calcium carbonate; (b) stirring the contents of the vessel while heating for one hour at 71 to 93° C. under a vacuum of 20 mm. mercury and simultaneously removing all of the petroleum naphtha along with any water present in the vessel; (c) cooling the mixture to 70° C.; (d) adding 544 parts of tolylene-2,4-diisocyanate and stirring the reaction mixture for two hours at a temperature of 71 to 93° C.; (e) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture for five minutes; (f) adding 0.25 part stannous octoate and stirring the mixture at 82 to 93° C. for two hours; (g) mixing 86.5 parts of the resulting liquid polyurethane composition with 12.0 parts of petroleum naptha (B.R. 88–142° C.) and 1.5 parts of a 33% solution in methyl ethyl ketone of resorcinol monobenzoate; and (h) mixing 94 parts of the resulting composition with 6 parts of pyrogenic silica having an average particle size of 0.01 micron ("Cabosil" M-5).

The bonding operation is completed by (1) extruding a strip of the polyurethane adhesive measuring ¼-inch wide and ¼-inch thick onto the primed periphery of the windshield, (2) mounting the resulting assembly in place on the steel windshield-receiving member so that the polyurethane adhesive is in interposed contact with the entire periphery of the windshield and the steel member, and (3) keeping the layers of the assembly in intimate contact with each other while the polyurethane composition is converted to a solid polyurethane elastomer by allowing the assembly to stand for seven days at 25° C. and 50% relative humidity.

The windshield is now integrally bonded to the steel body member. The bond is strong, resilient and impervious to fluids and dust when the automobile is subjected to normal use conditions; also the bond has high resistance to degradation by sunlight.

EXAMPLE I-B

Results similar to those described in Example I-A are obtained by repeating Example I-A except the polyurethane adhesive composition is prepared by (a) charging a reaction vessel (equipped with stirrer, thermometer, reflux condenser and nitrogen inlet) with 3110 parts polypropylene glycol (molecular weight 2000), 650 parts petroleum naphtha (B.R. 88–142° C.), 180 parts carbon black and 3080 parts finely-divided calcium carbonate; (b) stirring the contents of the vessel while heating to reflux temperature and continuing to stir at this temperature for two hours; (c) removing all of the petroleum naphtha along with any water present in the vessel by distillation; (d) cooling the mixure to 90° C.; (e) adding 780 parts of 4,4'-diphenyl-methane-diisocyanate and stirring the mixture for five minutes; (f) adding 0.25 part stannous octoate and stirring the mixture at 100° C. for 45 minutes; (g) adding 1550 parts of a triol having an average molecular weight of about 6000 and a hydroxyl value of 28 prepared by condensing about 100 moles of propylene oxide with one mole of 1,2,6-hexanetriol, and stirring the resulting mixture at 100° C. for two hours; (h) mixing 86.5 parts of the resulting liquid polyurethane composition with 12.0 parts of petroleum naphtha (boiling range 88–142° C.) and 1.5 parts of a 33% solution in methyl ethyl ketone of resorcinol monobenzoate; and (i) mixing 94 parts of the resulting composition with 6 parts of pyrogenic silica having an average particle size of 0.01 micron ("Cabosil" M-5).

EXAMPLE I-C

Results similar to those described in Example I-A are obtained by repeating Example I-B except in preparing the polyurethane adhesive composition the 780 parts of 4,4'-diphenyl-methane-diisocyanate used in step (e) are replaced with 544 parts of tolylene-2,4-diisocyanate.

EXAMPLE II

Part A

A lap joint is prepared as follows for testing properties of a bond obtained between glass and steel articles in accordance with the invention:

(a) A sheet of plate glass having a thickness of ¼ inch, a width of 1 inch and a length of 4 inches is cleaned and primed on one side as the windshield is in Example I-A.

(b) A sheet of autobody steel having a thickness of $\frac{1}{16}$ inch, a width of 1 inch and a length of 4 inches is zinc phosphate coated, primed and painted on one side as the steel member is in Example I-A.

(c) The glass sheet is placed primed-side-up on a bench top and the metal sheet is placed painted-side-down so that part of it is in superposed contact with the glass sheet and so that there is a ½-inch end-to-end overlap of the two sheets.

(d) The metal sheet is removed and a strip of the polyurethane adhesive described in Example I-B measuring 1 inch long, ¼ inch wide and ¼ inch thick is extruded onto the portion of the glass sheet which had been in contact with the metal sheet.

(e) The metal sheet is returned to the position described in step (c) so that the adhesive strip lies in interposed contact with the overlapped portions of the two sheets and one edge of the adhesive strip lies in the same vertical plane as the overlapped end of the metal sheet.

(f) The layers of the assembly are kept in intimate contact with each other while the polyurethane adhesive is converted to a solid polyurethane elastomer by allowing the assembly to stand for seven days at 25° C. and 50% relative humidity.

The bonded assembly is placed in a conventional accelerated weathering machine wherein the assembly is subjected intermittently to a spray of water and to the actinic light of a sunlamp. The glass surface of the assembly faces the sunlamp. The assembly remains in the weathering machine for an extended period of time until it has been subjected to 1200 langleys of ultraviolet radiation; a langley is a unit of solar radiation equal to one gram calorie per square centimeter of irradiated surface. Then the lap joint is tested on an Instron Tensile Test Machine at a chart speed of 10 inches per minute and a crosshead speed of one inch per minute using a full scale load of 100 pounds on the "D" cell. The direction of force is parallel to the longest side of the test assembly. The bond has a lap shear value of 220 p.s.i. (based on an estimated final adhesive layer width and thickness of ¼ inch). The breakage occurs within the layer of polyurethane adhesive (cohesive failure); thus, the polyurethane adhesive remains strongly bonded to the glass and metal surfaces. Unexpectedly, the accelerated weathering causes substantially no reduction in the strength of the bond.

Useful results are obtained when Part A is repeated except the resorcinol monobenzoate of the polyurethane composition is replaced individually with each of the other 6 stabilizers mentioned above (compounds B through G).

Part B

For purposes of comparison, a lap joint outside the scope of the present invention is prepared as described above in Part A except the resorcinol monobenzoate is omitted from the polyurethane composition.

The bonded assembly is placed in a weathering machine as described in Part A. After being subjected to only 200 langleys, the assembly is tested in an Instron machine as described in Part A. The bond has a lap shear value of 150 p.s.i. and the breakage undesirably occurs at the glass/polyurethane interface (adhesive failure).

Another lap joint is prepared in the same manner; after the assembly is subjected to 1200 langleys in the weathering machine, the bond has a lap shear value of only 70 p.s.i., and again the breakage occurs at the glass/polyurethane interface. Thus, the accelerated weathering causes a great reduction in the strength of the bond when the resorcinol monobenzoate is omitted from the adhesive polyurethane composition.

EXAMPLE III-A

Two sheets of glass are resiliently and sealingly bonded to each other by repeating Part A of Example II except the sheet of steel of step (b) is replaced with a sheet of glass prepared as described in step (a). After the assembly is subjected to 2400 langleys in the weathering machine described in Part A of Example II, the two sheets of glass are still strongly bonded together. When the bond is broke on an Instron machine, the breakage occurs within the polyurethane adhesive layer.

EXAMPLE III-B

Results similar to those described in Example III-A are obtained by repeating that example except the two sheets of glass are replaced with two sheets of ¼ inch thick clear acrylic plastic (polymethyl methacrylate), both sheets being cleaned and primed on one side as the windshield is in Example I-A.

We claim:

1. An adhesive polyurethane composition having incorporated therein as a stabilizer about 0.1–2.0% of resorcinol monobenzoate based on the weight of polyurethane in the composition.

2. A composition according to claim 1 wherein the resorcinol monobenzoate content is about 0.4–0.8%.

References Cited

UNITED STATES PATENTS

| | | | |
|---|---|---|---|
| 2,727,843 | 12/1955 | Tillyer | 260—45.85 X |
| 2,874,146 | 2/1959 | Deverell-Smith et al. | 260—45.85 |
| 2,905,554 | 9/1959 | Fuchsman et al. | 260—45.85 X |
| 2,984,645 | 5/1961 | Hoeschele | 260—45.8 |

DONALD E. CZAJA, *Primary Examiner.*

M. J. WELSH, *Assistant Examiner.*

U.S. Cl. X.R.

117—124, 138.8, 161; 161—190, 194; 260—45.8, 45.9, 45.95